(12) United States Patent
Shih-Tsung

(10) Patent No.: US 6,980,421 B2
(45) Date of Patent: Dec. 27, 2005

(54) FRONT PANEL FOR PERSONAL COMPUTER

(75) Inventor: Chen Shih-Tsung, Taipei (TW)

(73) Assignee: Shuttle Inc., (TW)

( * ) Notice: Subject to any disclaimer, the term of this patent is extended or adjusted under 35 U.S.C. 154(b) by 164 days.

(21) Appl. No.: 10/459,389

(22) Filed: Jun. 10, 2003

(65) Prior Publication Data

US 2004/0052042 A1    Mar. 18, 2004

(30) Foreign Application Priority Data

Jun. 28, 2002    (TW) ............................... 91209480 U

(51) Int. Cl.[7] ............................. H05K 7/00; H05K 5/03
(52) U.S. Cl. ...................... 361/683; 361/681; 361/682; 360/97.01; 312/223.2
(58) Field of Search ............................... 361/679, 683, 361/681, 682, 802, 803; 312/223.2, 223.3; 362/31, 457, 458; 349/44–47, 1, 58, 65; 428/10, 428/18, 19

(56) References Cited

U.S. PATENT DOCUMENTS

| | | | | |
|---|---|---|---|---|
| 5,351,176 A | * | 9/1994 | Smith et al. ................. | 361/681 |
| 5,463,481 A | * | 10/1995 | Yamamura ................... | 349/74 |
| 6,219,229 B1 | * | 4/2001 | Lee ............................. | 361/683 |
| 6,519,146 B2 | * | 2/2003 | Nagashima et al. ........ | 361/687 |
| 6,563,705 B1 | * | 5/2003 | Kuo ............................ | 361/687 |
| 2003/0202318 A1 | * | 10/2003 | Lee ............................. | 361/683 |

FOREIGN PATENT DOCUMENTS

| | | | | | |
|---|---|---|---|---|---|
| CN | 1299224 A | * | 6/2001 | ............ | H04Q 7/32 |
| GB | 2262388 A | * | 12/1991 | ............ | H05K 5/03 |

* cited by examiner

Primary Examiner—Michael Datskovskiy
(74) Attorney, Agent, or Firm—Fenwick & West LLP

(57) ABSTRACT

A panel of a computer's main unit includes a display board, which is capable of showing colors responsive to electrical signals. A circuit is coupled to the display board for controlling colors displayed thereon.

10 Claims, 2 Drawing Sheets

US 6,980,421 B2

FRONT PANEL FOR PERSONAL COMPUTER

CROSS REFERENCE TO RELATED APPLICATIONS

This application claims the right of priority based on Taiwan application serial no. 091208582, filed on Jun. 10, 2002, which is herein incorporated in its entirety by reference.

BACKGROUND

1. Field of the Invention

The present invention relates to a panel of computer main unit and particularly to a panel that is capable of showing system information, colors, and/or pictures.

2. Background of the Invention

The computer main unit is the hub of a computer system. It typically includes the motherboard, power supply, and other main circuitry of the computer, as well as any internal devices, and it is also often connected to a number of external peripheral devices externally. The conventional computer main unit is a closed box with closed lateral sides, a heat dissipated rear side, and an operational front side. The operational front side is usually arranged as a panel, which may include openings for accommodating disk drives or other external devices. The front panel also often includes a number of operational buttons, switches, and/or other like mechanisms.

Due to the fundamental nature of the computer main unit in the computer system, computer manufacturers have begun to pay some attention to the aesthetic design of the computer main unit. But beyond decorations, such as stripes or other design markings, or shape changes to other parts of the computer, the front panels of most computers have undergone relatively minor changes in design.

Suppliers and consumers alike have generally treated the computer front panel as an operational interface only. Hence, there has been little attention paid to the visual aesthetics of the panel are not so cared such that a computer main unit with creative modeling is usually attached with a conventional modeling of panel. In fact, compared to other personal consumer products, such as mobile phones and watches, the appearance of the personal computer has undergone relatively minor visual changes.

SUMMARY OF THE INVENTION

Accordingly, the present invention provides a computer main unit having a panel configured to provide additional functionality. In one embodiment, the panel comprises a display board capable of displaying colors responsive to a control signal. A circuit is coupled to the display board for providing electrical signals to the display board, thereby controlling the colors displayed thereon. The panel is normally an operational end of the computer's main unit and is often viewable to a user when the computer is installed. Therefore, the front panel provides a user with a visual stimulus as controlled by the circuit.

The novel features of the invention are set forth with particularity in the appended claims. The invention will be best understood from the following description when read in conjunction with the accompanying drawings.

DETAILED DESCRIPTION OF THE PREFERRED EMBODIMENTS

Figure 1:
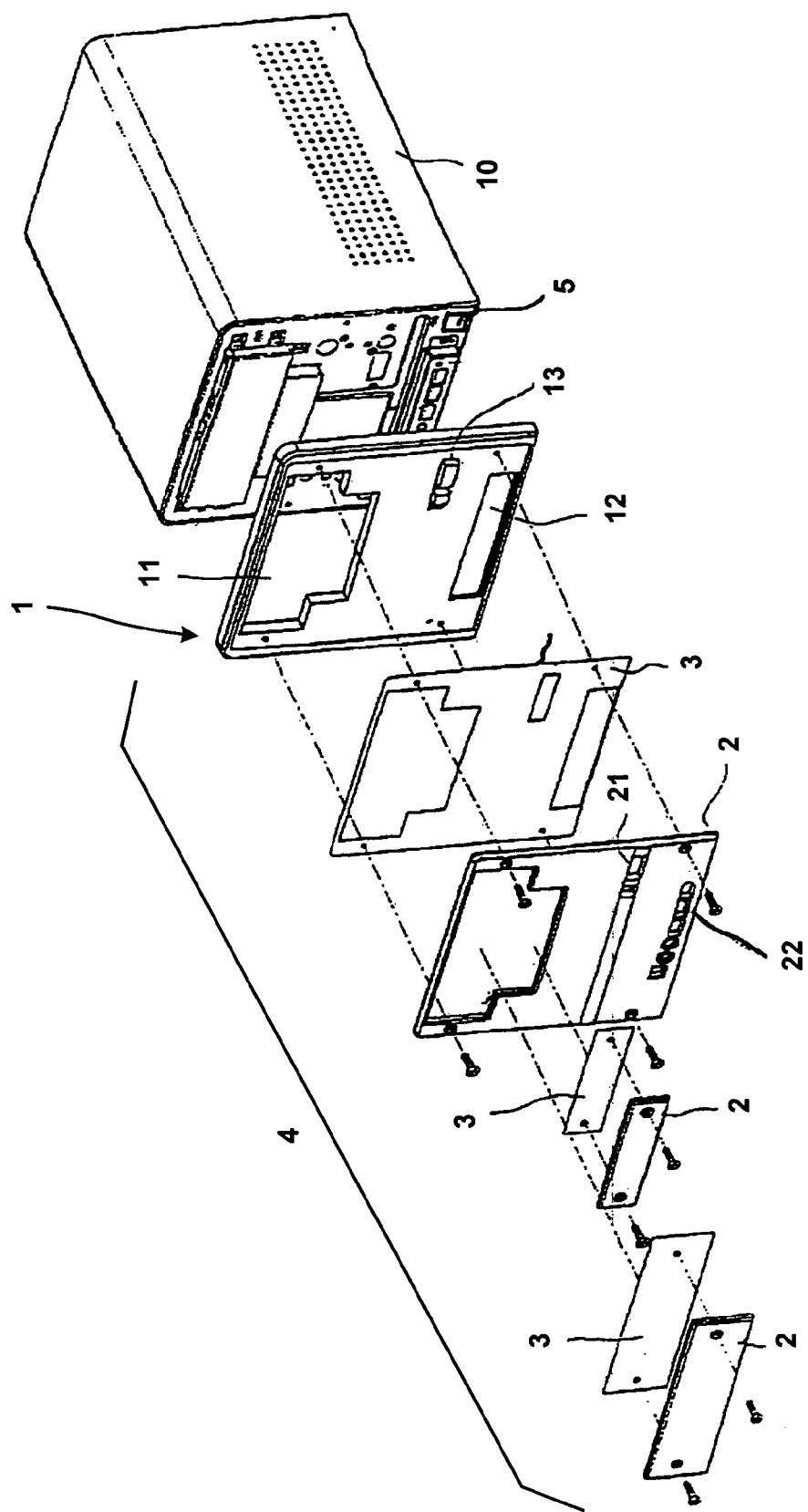
FIG. 1 is a disassembled perspective view of a panel of a computer main unit according to an embodiment of the present invention.
Figure 2:
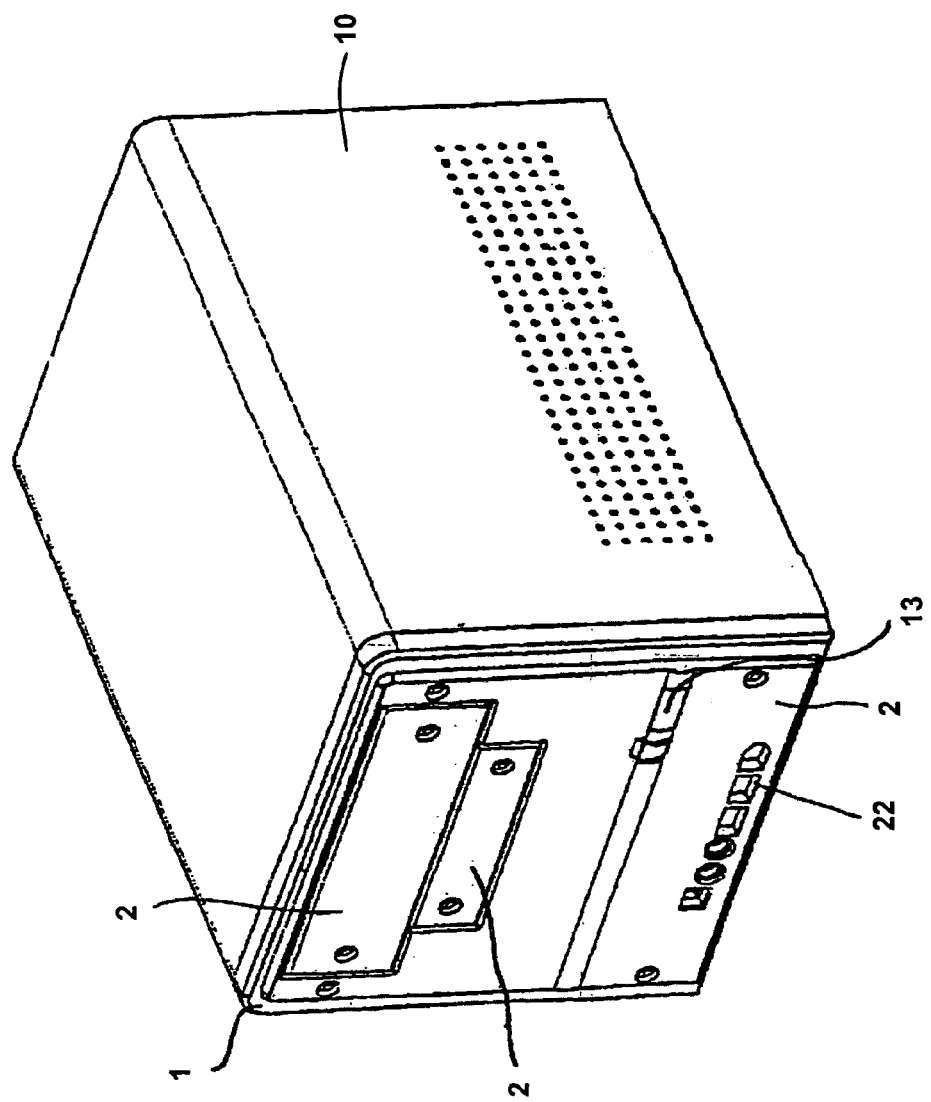
FIG. 2 is a perspective view illustrating the panel in FIG. 1 having been assembled.

With reference to FIGS. 1 and 2, a computer main unit 10 is shown according to an embodiment of the present invention. The computer main unit 10 includes a panel 4. In one embodiment, the panel 4 is disposed at an operational end of the computer main unit 10, which is typically a front end from which disk drives and buttons are accessed. In one embodiment, the size and the shape of the panel 4 correspond to the end of the computer main unit 10 to which it is engaged.

An embodiment of the invention includes an inner shield 1, an outer shield 2, and at least one display board 3. FIG. 1 shows an assembly view of an embodiment of the invention. The front panel display system can be assembled to, e.g., the operation end of a computer main unit 10.

The inner shield 1 has a size and a shape corresponding to the operational end of the computer main unit 10. At the upper portion of the inner shield 1 is an opening 11 for accommodating internal devices of the computer main unit, such as removable media devices. Further, a lower portion of the inner shield 1 has an opening 12 for accommodating connections from external devices outside the computer main unit 10 to internal devices or other circuitry within the computer main unit 10.

The outer shield 2 can cover and join with the inner shield 1 to secure the panel 4. Preferably, the outer shield 2 is made of transparent material or otherwise configured to allow viewing of the panel 4. Further, the outer shield 2 has a size and a shape corresponding to the operation end of the main unit 10 as the inner shield does. An access port 21 can be provided to accommodate buttons 13 and other controls. In addition, the outer shield 2 is provided with a connecting hole 22 corresponding to the connecting opening 12.

The panel further includes a display board 3. The display board 3 is configured to sit against and be secured in part by the inner shield 1. As the assembly drawing of FIG. 1 shows, the display board 3 is disposed between the inner shield 1 and an outer shield 2. The display board 3 further corresponds to the shield opening 11; however, additional display boards 3 may be provided to cover areas corresponding to the shield opening 11.

Preferably, the outer shield 2 is transparent or otherwise allows the display board 3 to be visible, either partially or entirely, when the panel is assembled. In one embodiment, the display board 3 comprises one or more a cold light plates. Using a plurality of cold light plates enables two or more different color illumination layers to be provided, where each illumination layer is made from electricity excited light film material. By layering a number of cold light plates and selectively illuminating one of the plates, the colors displayed by the display board 3 can be controlled. Using technology presently available, a number of different colors can be implemented, including white, orange, red, pink, green, yellow, and blue. These are achieved by selecting from rare earth elements such as $PrF_3$, $NaF_3$, $SmF_3$, $EuF_3$, $TbF_3$, $DyF_3$, $HoF_3$, $ErF_3$, $TmF_3$, $YbF_3$, and $MnF_2$.

The display board 3 is electrically coupled to a circuit 5 for receiving electrical energy therefrom. In the case where the display board 3 comprises one or more cold light plates, the display board uses electrical energy to generate excited cold light. In one embodiment, the circuit 5 is operatively coupled to the computer and receives electrical energy from the computer's power supply. However, the circuit 5 may be separately implemented and include its own power source. The control of color selection can be set via press button or software. The circuit 5 may be attached to the main unit 10.

In another embodiment, the display board 3 comprises a liquid crystal display (LCD). Other display devices may also be used, alone or in combination with others. With a liquid crystal display, a circuit 5 is coupled to the LCD and controls the display thereon.

The display board 3 can be configured to display a solid color or any among an unlimited selection of characters, numbers, or pictures, in addition to a background. Accordingly, the display board 3 can be configured to display functional information, such as the time, temperature, or characteristics of the computer, for example.

With reference to FIG. 2 again, an assembled perspective view of the panel is illustrated. Due to the panel being provided with the display board 3, colors can be shown via display and changeability of displayed colors can be achieved by way of different display materials in company with hardware design. In this way, it is possible to enhance the appearance of the computer, and to provide information to the user. In addition, as the foregoing, the background and the pictures can be operated with change between colors and the display of information can be executed accordingly. Furthermore, the user can select the operation of the panel, allowing the user to customize the appearance and function of the computer main unit 10.

The foregoing description of the embodiments of the invention has been presented for the purposes of illustration and description. It is not intended to be exhaustive or to limit the invention to the precise forms disclosed. Persons skilled in the relevant art can appreciate that many modifications and variations are possible in light of the above teaching. It is therefore intended that the scope of the invention be limited not by this detailed description, but rather by the claims appended hereto.

I claim:

1. A computer main unit having a panel, the panel comprising:

a display board comprising a plurality of cold light plates that can display different colors, each cold light plate capable of emitting light responsive to a control signal; and a circuit coupled to the display board for controlling the colors displayed on the cold light plates.

2. The computer main unit of claim 1, wherein the panel is at an operational end of the computer main unit housing.

3. The computer main unit of claim 1, wherein the panel further includes a transparent outer shield that covers the display board.

4. The computer main unit of claim 1, wherein at least one cold light plate is configured to display a background, and at least one cold light plate is configured to display a picture image.

5. The computer main unit of claim 1, wherein the display board is configured to display information responsive to the control signals.

6. The computer main unit of claim 5, wherein the information includes one or more of: time and temperature.

7. The computer main unit of claim 1, wherein one or more cold light plates of the display board is removable and replaceable.

8. A computer system comprising:

a front panel that includes an inner plate and a transparent outer plate that join together;

a display board comprising one or more cold light plates configured to fit within an opening between the inner plate and outer plate of the front panel and be secured thereby, each cold light plate capable of emitting a color of light responsive to a control signal; and a circuit coupled to the display board for providing one or more control signals, the control signals causing the one or more cold light plates to emit a corresponding color of light.

9. The computer system of claim 8, wherein the display board comprises a plurality of cold light plates capable of emitting different colors of light.

10. The computer system of claim 8, wherein one or more cold light plates of the display board is removable and replaceable.

* * * * *